US008431049B2

(12) United States Patent
Citti et al.

(10) Patent No.: US 8,431,049 B2
(45) Date of Patent: *Apr. 30, 2013

(54) TIN OXIDE-BASED ELECTRODES HAVING IMPROVED CORROSION RESISTANCE

(75) Inventors: Olivier Citti, Wellesley, MA (US); Charles N. McGarry, Buckhannon, WV (US); Yves Boussant-Roux, Lexington, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 1669 days.

This patent is subject to a terminal disclaimer.

(21) Appl. No.: 11/132,721

(22) Filed: May 19, 2005

(65) Prior Publication Data

US 2006/0261317 A1    Nov. 23, 2006

(51) Int. Cl.
*H01B 1/02*     (2006.01)
*H01M 4/00*    (2006.01)
*C04B 35/00*   (2006.01)

(52) U.S. Cl.
USPC .................. 252/520.1; 429/128; 501/134

(58) Field of Classification Search .............. 204/265, 204/290–292; 205/634–635; 252/520.1–520.2, 252/521.2, 299.01; 501/126, 134, 94, 102–103, 501/105–107; 373/36; 429/128
See application file for complete search history.

(56) References Cited

U.S. PATENT DOCUMENTS

| 2,467,144 A | 4/1949 | Mochel |
| 2,490,825 A | 12/1949 | Mochel |
| 3,249,449 A * | 5/1966 | Kiehl et. al. ................... 501/105 |
| 3,287,284 A | 11/1966 | Norman et al. |
| 3,341,473 A | 9/1967 | Loch |
| 3,412,194 A * | 11/1968 | Strohmeier et. al. ........... 373/36 |
| 3,718,550 A | 2/1973 | Klein |
| 4,311,569 A * | 1/1982 | Dempsey et al. .............. 205/635 |
| 4,528,083 A * | 7/1985 | LaConti et al. ................ 204/265 |

FOREIGN PATENT DOCUMENTS

| DE | 205 888 | 1/1984 |
| DE | 102004014374 A1 * | 10/2005 |
| EP | 0 505 750 A2 | 9/1992 |
| GB | 778 192 A | 7/1957 |
| JP | 55 121208 | 9/1980 |
| JP | 55 122898 A | 9/1980 |
| JP | 11246265 A * | 9/1999 |
| JP | 2002075165 A * | 3/2002 |
| SU | 1025700 A | 6/1983 |
| SU | 1 416 472 A | 8/1988 |

OTHER PUBLICATIONS

Machine Translation and Abstract in English of JP 11-246265.*
Machine Translation and Abstract in English of JP 2002-075165.*
Machine Translation and Abstract in English of DE 10-2004-014-374.*

(Continued)

*Primary Examiner* — Barbara Gilliam
*Assistant Examiner* — Claire L. Roe
(74) *Attorney, Agent, or Firm* — Abel Law Group, LLP; Mike W. Crosby (57) ABSTRACT

In one embodiment a tin oxide based electrode is disclosed. The tin oxide-based electrode includes a base material of tin oxide, a resistivity modifier, a sintering aid, and a corrosion inhibitor. The corrosion inhibitor forms a solid solution with the base material and has a melting point not less than about 1700° C. and a partial pressure of not greater than about 1.0E-7 atmospheres at 1500° C. The corrosion inhibitor further includes 0-4.0 wt % $ZrO_2$ based on the total weight of the composition.

17 Claims, 5 Drawing Sheets

OTHER PUBLICATIONS

Kato et al. ("The Corrosion of Zircon and Zirconia Refractories by Molten Glasses," Journal of Non-Crystalline Solids, 1986, 80, 681-687).*

Manfredo et al. ("Solubility of Refractory Oxides in Soda-Lime Glass", Communications of the American Ceramic Society, Aug. 1984, C155-C158).*

Maitre, A., et al., "Effect of ZrO2 Additions on Sintering of SnO2-based Ceramics", Journal of the European Ceramic Society, vol. 24, pp. 3111-3118, 2004.

Gaillard-Allemand, B., et al., "Experimental Study of the SnO2-ZrO2 Phase Diagram", Journal of the European Ceramic Society, vol. 22, pp. 2297-2303, 2002.

* cited by examiner

TIN OXIDE-BASED ELECTRODES HAVING IMPROVED CORROSION RESISTANCE

BACKGROUND

1. Field of the Disclosure

The present invention is generally directed to tin oxide-based ceramic bodies, and particularly, electrodes for use in glass melting and refractory applications.

2. Description of the Related Art

Commercial glass melting operations typically rely upon use of fossil fuels such as natural gas or oil. The use of electric energy is also possible either as an additional source of energy, as the main source of energy, or the sole source of energy as in an electric furnace. In the latter case, electric furnaces make use of refractory electrodes whose very high electrical conductivity allows direct heating of the glass by passing the current between electrodes directly through the glass. Such electrodes have been fairly well studied in the art. However, with the development of new technologies and increasing demand for high performance glass components, such as for utilization in flat displays including LCD and plasma displays, increasing demands have been placed upon the mechanical and optical performance of glasses, and in turn the performance of glass melting equipment.

In the context of electric furnacing operations, use has been made of various tin oxide-based electrode compositions, such as those detailed in U.S. Pat. No. 3,287,284 (commonly owned by the present assignee). While the technology described in U.S. Pat. No. 3,287,284 is decades old, development of new tin oxide electrode materials has been incremental, common of mature art areas. Life span and long term durability have become industry requirements to manufacture high performance glasses and displays. Accordingly, a need continues to exist in the art for improved tin oxide-based components, and tin oxide-based electrodes.

SUMMARY

According to one aspect, a tin oxide-based electrode is disclosed. The electrode is formed from a composition comprising a base material of tin oxide, a resistivity modifier, a sintering aid, and a corrosion inhibitor. The corrosion inhibitor forms a solid solution with the base material and has a melting point not less than about 1700° C., a partial pressure of not greater than about 1.0 E-7 atmospheres at 1500° C., and includes 0-4.0 wt % $ZrO_2$ based on the total weight of the composition.

According to another aspect, a tin oxide-based electrode is provided. The electrode has a composition comprising a base material of tin oxide, a resistivity modifier, a sintering aid, and an oxide selected from the group consisting of $ZrO_2$ in an amount 0-4.0 wt %, $HfO_2$, $TiO_2$, $Ta_2O_5$, and $CeO_2$.

According to another aspect, a tin oxide-based ceramic component is provided. The ceramic component has a composition comprising a base material comprising tin oxide and a corrosion inhibitor. The corrosion inhibitor forms a solid solution with the base material and has a melting point not less than about 1700° C. and a partial pressure of not greater than about 1.0 E-7 atmospheres at 1500° C. and a resistivity not greater than about 1.0 E-1 ohm cm.

According to another aspect, a tin oxide-based electrode is provided. The ceramic component has a composition comprising a base material comprising tin oxide, a resistivity modifier, a sintering aid, and a corrosion inhibitor. The corrosion inhibitor forms a solid solution with the base material and has a melting point not less than about 1700° C. and a partial pressure of not greater than about 1.0 E-7 atmospheres at 1500° C., and also comprises $ZrO_2$ and $HfO_2$.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

According to one aspect, a tin oxide-based electrode is formed by sintering a composition including $SnO_2$ as the base component with particular additives for modifying the properties of the electrode. Tin oxide is the major component, typically forming not less than about 90 weight percent (hereinafter "wt %") of the composition, some embodiments have not less than about 95 wt % or even 98 wt % of the composition. As to the particular form of the tin oxide, certain embodiments have taken advantage of essentially entirely reactive (virgin) $SnO_2$ powder, while other embodiments have utilized $SnO_2$ in the form of grog or calcined powder. Oftentimes, this grog powder contains minor amounts of other oxides. These minor amounts of other oxides can represent up to 2 wt %, generally not greater than 1 wt % or not greater than 0.5 wt % of the composition from which the tin oxide based electrode according to embodiments of the present invention is formed. To the extent that other additives are provided, the minor oxides of the grog powder do not compose or count as part of the additive package described above, but rather, are considered part of the $SnO_2$ base of the electrode composition.

According to one aspect, additives to the tin oxide-based electrode include a resistivity modifier, a sintering aid and a corrosion inhibitor. The additives typically include an oxide, or group of oxides, that are selected because of their ability to modify certain characteristics of the electrode. Generally, the corrosion inhibitor is an oxide that forms a solid solution with the base material and has refractory properties such as a melting point not less than 1700° C. and a partial pressure at 1500° C. not less than about 1.0 E-7 atmospheres. (The partial pressure is measured at 1500° C., using 1 mol of the solid in a closed system having 1 liter of constant volume) Suitable materials that are selected as the corrosion inhibitors include $ZrO_2$, $HfO_2$, $TiO_2$, $Ta_2O_5$, and $CeO_2$ As such, another embodiment contemplates a group of suitable corrosion inhibitors to include $ZrO_2$, $HfO_2$, and $TiO_2$.

The oxides of the group of suitable corrosion inhibitors may be used independently or combined. In one embodiment, the corrosion inhibitor includes the combination of at least two oxides from the group including $ZrO_2$, $HfO_2$, $TiO_2$, $Ta_2O_5$, and $CeO_2$. In such embodiments demonstrating the combination of two or more corrosion inhibitors, the total amount of the additives is generally not greater than about 8.0 wt %, 7.0 wt % or 6.0 wt %. Still, in other embodiments the total amount of combined corrosion inhibitors is not greater than about 4.0 wt %, 3.0 wt % or even 2.0 wt %.

In a particular embodiment, $ZrO_2$ is a material of choice as a corrosion inhibitor which can be used alone or in combination with other corrosion inhibitors such as those noted above. In such embodiments, the amount of $ZrO_2$ is generally not greater than about 4.0% of the total composition by weight, such as not greater than about 3.5 wt % or about 3.0 wt %. Still, other embodiments utilize an amount of $ZrO_2$ not less than 2.5%, 2.25%, 2.0%, or even not less than about 1.85% of the total composition by weight.

In another embodiment, the corrosion inhibitor comprises $HfO_2$, and may be provided in amounts not greater than about 8.0 wt %. In other embodiments, the amount of $HfO_2$ is not greater than 7.0 wt %, 6.0 wt %, or even 5.0 wt %. Still, other embodiments utilize amounts of $HfO_2$ not greater than about 4.0 wt %, 3.0 wt %, 2.0 wt % or even 1.0 wt %.

Turning to the refractory properties of the corrosion inhibitors, in one embodiment, the partial pressure of the particular species of corrosion inhibitor may not be greater than about 1.0 E-7 atmospheres at 1500° C., using 1 mol of the solid in a closed, 1 liter constant volume. In other embodiments, the partial pressure of the species of corrosion inhibitor may not be greater than 1.0 E-10 atmospheres or even 1.0 E-12 atmospheres at 1500° C., using 1 mol of the solid in a closed, 1 liter constant volume. Values of not greater than 1.0 E-12, such as not greater than 1.0 E-13 are attributed to certain corrosion inhibitor species such as $ZrO_2$ and $HfO_2$.

In another aspect, the tin oxide composition includes a tin oxide base material, a resistivity modifier, a sintering aid and an oxide from the group including between $ZrO_2$, $HfO_2$, $TiO_2$, $Ta_2O_5$, and $CeO_2$. These oxides are selected for their corrosion resistance characteristics and refractory properties in tin oxide bodies. The oxides may be used independently or combined as discussed previously. According to one embodiment, $ZrO_2$ is selected as the oxide, and may comprise not greater than about 3.5 wt %, 3.0 wt %, or 2.0 wt %. In other embodiments, $ZrO_2$ is present in amounts not greater than about 1.5 wt % or 1.0 wt %. Other embodiments contemplate the use of $HfO_2$, which is present in amounts not greater than about 8.0 wt %. As such, $HfO_2$ may also be present in amounts not greater than about 7.0 wt %, 6.0 wt %, 5.0 wt % or 4.0 wt %. Still, other embodiments demonstrate the use of $HfO_2$ in amounts not greater than about 3.0 wt %, 2.0 wt % or even 1.0 wt %. According to other embodiments, the oxide additive may include the combination of two or more oxides in an amount not greater than about 8.0 wt %, 7.0 wt % or 6.0 wt %. Still, other embodiments contemplate a combination of two or more oxides in an amount not greater than about 5.0 wt %, 4.0 wt %, 3.0 wt % or even 2.0 wt %.

Addressing the addition of the sintering aids, such additives include a group of oxides that assist in the densification of the body during processing. A group of suitable oxides for the sintering aids includes CuO, ZnO, $Mn_2O_3$, CoO, and $Li_2O$. In another embodiment, a suitable group of sintering aids includes CuO, ZnO, and $Mn_2O_3$ as particularly suitable sintering aids. These materials may be combined or used independently, and comprise a small weight percent of the total composition. In one embodiment, the total amount of sintering aids comprise not greater than about 1.0 wt %. According to another embodiment, the amount of sintering aids comprise not greater than about 0.8% or 0.6% of the total composition by weight. Typically, such sintering aids do not have the combination of refractory properties of the corrosion inhibitors. Generally, the melting point of each of the sintering aids is lower than the corrosion inhibitors, and/or the partial pressure of the sintering aids is greater.

Turning to the resistivity modifier, such additives are included to modify the electrical characteristics of the $SnO_2$ base material, particularly to maintain a desirably low resistivity in the particular context of a manufactured electrode. In one embodiment, the group of suitable oxides that comprise the resistivity modifiers includes $Sb_2O_3$, $As_2O_3$, $Nb_2O_5$, $Bi_2O_3$, $UO_2$ and $Ta_2O_5$ and combinations thereof. In another embodiment, a group of suitable resistivity modifiers includes $Sb_2O_3$, $Nb_2O_5$, and $Ta_2O_5$. As with the other additives, the amount of the resistivity modifier is a fraction of the weight of the total composition. As such, the amount of resistivity modifier may not be greater than about 1.0% or even 0.8% of the total composition by weight. In one embodiment, the addition of the resistivity modifier controls the resistivity of the body at 1400° C. such that typically the resistivity is not greater than about 5.0 E-1. Still, other embodiments show a resistivity not greater than about 5.0 E-2 or even 1.0 E-2. Typically, the resistivity modifier does not have the combination of refractory properties of the corrosion inhibitors. Generally, the melting point of each the resistivity modifier is lower than the corrosion inhibitors, and/or the partial pressure of the resistivity modifier is greater.

The density of the ceramic body is an indication of the amount of porosity, including open porosity. Open porosity in the surface of the body are sites for initiating corrosion, therefore denser bodies are desirable in order to avoid high corrosion and reduced lifetimes. According to one embodiment, the body is not less than 6.50 g/cm³. Other embodiments have a density not less than about 6.55 g/cm³ or even 6.60 g/cm³.

According to another embodiment a tin oxide-based ceramic body is formed having a base material of tin oxide and a corrosion inhibitor in accordance that forms a solid solution with the base material. In one particular embodiment, the ceramic body has a resistivity at 1400° C. not greater than about 1.0 E-1 ohm cm, such as not greater than 5.0 E-2 ohm cm, or even not greater than about 1.0 E-2 ohm cm. Accordingly the tin-oxide based ceramic body is applicable to various refractory uses where both corrosion resistance and electrical resistivity are suitable characteristics.

According to another embodiment a tin oxide-based electrode is formed having a base material, a resistivity modifier, a sintering aid, and a corrosion inhibitor comprising $ZrO_2$ and $HfO_2$. In one particular embodiment, the $ZrO_2$ content in the corrosion inhibitor is not greater than about 4.0 wt % of the total weight of the composition. In such particular embodiments, the ceramic body is particularly suited for use as an electrode for glass melting. In the embodiments the total weight of the corrosion inhibitor may be greater, such as on the order of 8.0 wt % or less of the total weight of the composition (e.g., 4.0-8.0 wt %. total of $ZrO_2$ and $HfO_2$). The content of $HfO_2$ relative to the $ZrO_2$ may be limited, such as 0.5 wt % to 5 wt %, or 1 wt % to 3 wt %. In accordance with these embodiments containing 4.0-8.0 wt % $ZrO_2$ and $HfO_2$, the electrodes may find practical application in the context of refractories rather than glass melting, where the attendant high $ZrO_2$ and/or $HfO_2$ content, which causes an increase in resistivity, is not as important a feature as compared to glass melt applications.

Embodiments of tin oxide-based compositions have been found to have various desirable properties, such as improved corrosion resistance as shown in the Tables below. Corrosion resistance, as described in accordance with particular embodiments herein, is a measure of submerged corrosion resistance in the context of a dynamic corrosion resistance analysis in which tin oxide samples are partially submerged in molten glass at 1600° C. for 90 hours. As reported, the dynamic corrosion test procedure quantifies not only the submerged corrosion resistance of the tin oxide sample, but also the sublimation resistance. In the test procedure, the samples are rotated within a crucible of molten glass, to simulate the dynamic conditions of a furnace. In such long duration tests, the glass in the crucible is changed to minimize false corrosion resistance readings caused by a saturation of dissolved refractory in the glass which reduces the corrosion rate. In the dynamic corrosion resistance analysis, the volatilization and shrinkage of a sample is determined above and below the glass line. The loss of volume of the sample above the glass line is due to sublimation, while the loss of volume at and below the glass line is due to submerged corrosion, attributed to the solubility of the sample in the glass melt. The embodiments described herein have demonstrated not only improved sublimation resistance, but notably improved submerged corrosion resistance.

The samples were evaluated by measuring the volume difference before and after the test. Two measurements were obtained, the volatilization or sublimation of the samples above the glass line, and submerged corrosion at and below the glass line. The corrosion or sublimation resistance index was calculated by relative volume loss ($\Delta V$-V) of a reference sample (free of corrosion inhibitors) versus relative volume loss of the sample, multiplied by 100. The reference sample has an index of 100, and any sample having a higher corrosion resistance will accordingly have a higher index than the reference sample.

Table 1 illustrates the effect of the corrosion inhibitor in terms of submerged corrosion resistance and sublimation of the sample. In this particular example a Z composition was the reference standard composition, comprising 98.4 wt % $SnO_2$, 1.0 wt % $Sb_2O_3$, 0.5 wt % ZnO and 0.1 wt % CuO. The dynamic corrosion test was completed using LCD glass at a testing temperature of 1600° C. for 90 hours. As illustrated in Table 1, the various test samples were altered from the standard Z composition by adding various percentages of a corrosion inhibitor, in this particular case $ZrO_2$, to the tin oxide body.

TABLE 1

| Table | Density | Total corrosion | | Submerged corrosion | | Sublimation | |
|---|---|---|---|---|---|---|---|
| 11600° C., 90 h | (g/cm³) | Volume (%) | Index | Volume (%) | Index | Volume (%) | Index |
| Z | 6.51 | 39 | 100 | 22.26 | 100 | 46.0 | 100 |
| Z + 1% $ZrO_2$ | 6.55 | 15.3 | 255 | 20.56 | 108 | 13.0 | 353 |
| Z + 2% $ZrO_2$ | 6.55 | 18.01 | 217 | 18.48 | 120 | 17.8 | 258 |
| Z + 4% $ZrO_2$ | 6.54 | 15.32 | 255 | 19.51 | 114 | 13.5 | 341 |
| Z + 6% $ZrO_2$ | 6.52 | 14.61 | 267 | 20.06 | 111 | 12.2 | 378 |
| Z + 8% $ZrO_2$ | 6.52 | 11.05 | 353 | 16.97 | 131 | 8.5 | 541 |

The submerged corrosion resistance improved for all of the samples containing the corrosion inhibitor $ZrO_2$ as illustrated by the submerged corrosion index of each sample containing $ZrO_2$ as compared to the Z composition standard. While the 8.0 wt % $ZrO_2$ demonstrated the highest corrosion resistance index, the sample containing 2.0 wt % $ZrO_2$ illustrated a desirable improvement in corrosion resistance. The sublimation resistance index was improved for all samples containing $ZrO_2$. Also, the density of the samples was not degraded by the addition of the corrosion inhibitor, in fact each sample had improved density, especially for the samples containing 1.0 wt % and 2.0 wt % $ZrO_2$.

Figure 1:
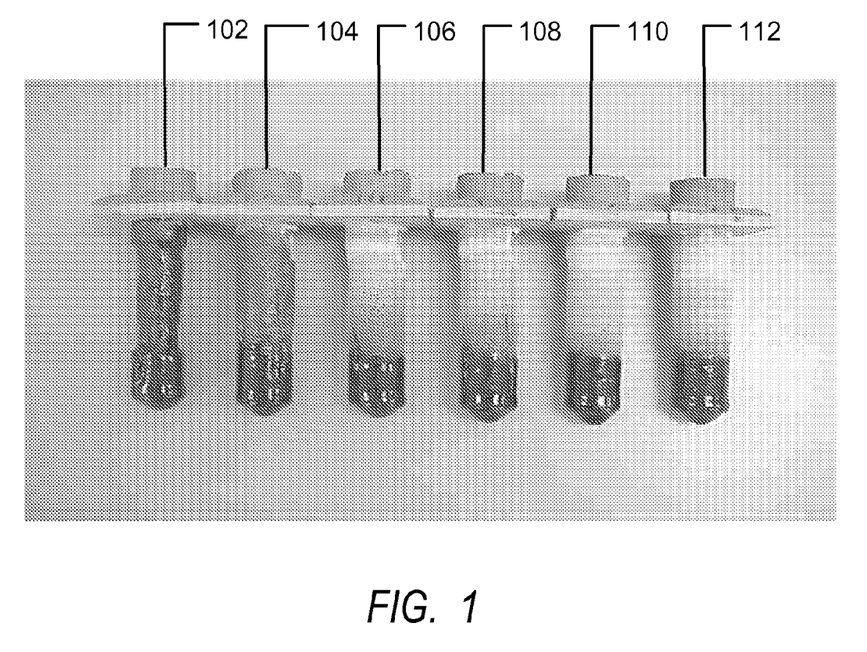
FIG. 1 is a picture of sample electrodes after a dynamic corrosion analysis showing various degrees of volume loss due to corrosion.

FIG. 1. illustrates representative samples from each group of tested compositions in Table 1. According to a particular embodiment the samples constructed were tin oxide-based electrodes. Typical electrodes may take on various geometric contours including bullet-shaped cylindrical members or generally rectangular or polygonal members. A standard Z composition 102 shows the greatest volume loss as shown by the data from Table 1. The Z composition standard had the largest loss of volume from both corrosion and sublimation. The 1.0 wt % $ZrO_2$ sample 104 and 2.0 wt % $ZrO_2$ sample 106 show an improvement in size and less volume loss. The 2.0 wt % $ZrO_2$ sample 106 show less volume loss than the 1.0 wt % $ZrO_2$ sample 104 and an equivalent volume to the 4.0 wt % $ZrO_2$ sample 108, the 6.0 wt % $ZrO_2$ sample 110, and the 8.0 wt % $ZrO_2$ sample 112. As the data from Table 1 would indicate, and as shown in FIG. 1, the 8.0 wt % $Zro_2$ sample 112 appears the most robust after the dynamic corrosion test.

Figure 2:
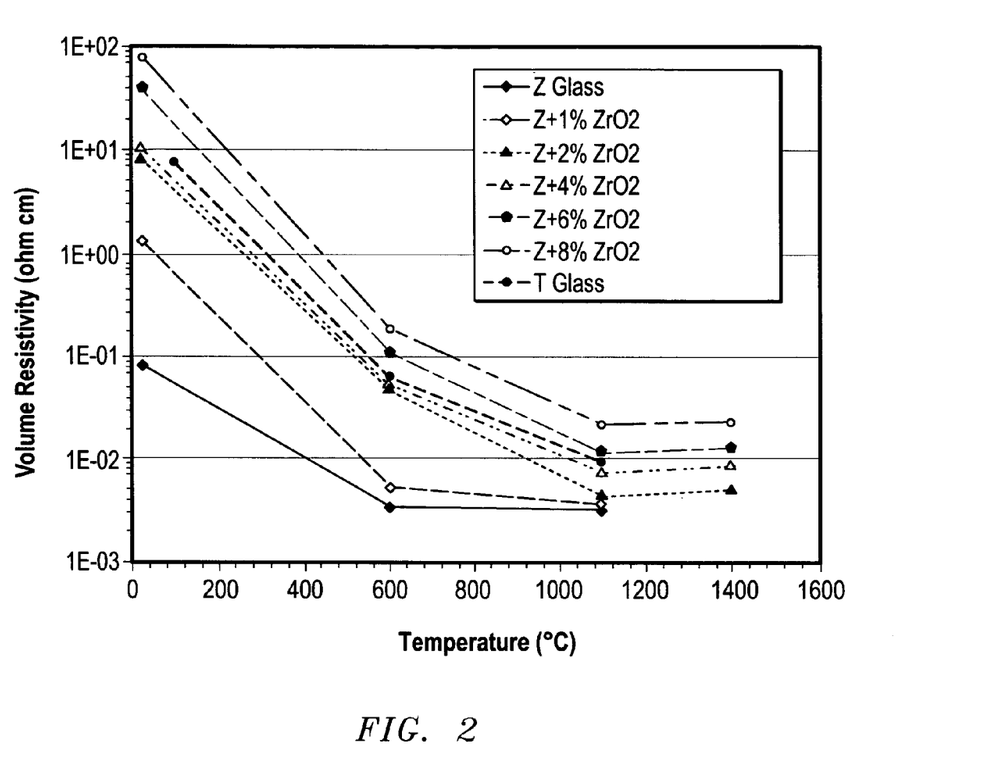
FIG. 2 is a graph illustrating the resistivity of electrode samples from Table 1 at various temperatures.

Turning to FIG. 2 a graph illustrates the resistivity of the samples provided in Table 1, at various temperatures. The resistivity of the samples was obtained by applying a DC current through the sample and measuring the voltage drop between two leads. The test was performed over a range of increasing currents until the sample reached its limit. The dimensions of the sample were then measured to calculate resistivity. The resistivity of each sample was measured at room temperature, 600° C., 1100° C., 1400° C. and again at room temperature after cooling down.

The trends illustrated by FIG. 2 demonstrate that an increase in the amount of the corrosion inhibitor, in this case $ZrO_2$, results in an increase in resistivity at all temperatures. The increase in resistivity as compared to the Z composition is more pronounced at room temperature and less pronounced at the highest measured temperature, 1400° C. Yet, at 1100° C., the difference between the samples containing 1.0 wt % $ZrO_2$ and 8.0 wt % $ZrO_2$ is approximately a factor of ten. The 1.0 wt % $ZrO_2$ composition do not demonstrate the corrosion resistance of the 8.0 wt % $ZrO_2$ composition, however the 1.0 wt % $ZrO_2$ composition shows better resistivity. The information provided in FIG. 2 and Table 1 suggests that a suitable sample, having a balance of corrosion resistance and resistivity, contains an amount of $ZrO_2$ less than about 8.0 wt % and preferably not greater than about 2.0 wt % in the Z composition standard.

Table 2 illustrates the effect of $ZrO_2$ on a standard T composition comprising about 98.5 wt % $SnO_2$, 1.0 wt % $Sb_2O_3$, and 0.5 wt % $MnO_2$. The dynamic corrosion test was completed using an LCD glass at 1600° C. for 90 hours. As illustrated in Table 2, the test samples comprise various percentages of $ZrO_2$, added to the T composition.

TABLE 2

| Table | Density | Total corrosion | | Submerged corrosion | | Sublimation | |
|---|---|---|---|---|---|---|---|
| 21600° C., 90 h | (g/cm³) | Volume (%) | Index | Volume (%) | Index | Volume (%) | Index |
| T | 6.71 | 36.16 | 100 | 24.84 | 100 | 39.3 | 100 |
| T + 1% $ZrO_2$ | 6.65 | 23.94 | 151 | 14.02 | 177 | 26.6 | 148 |
| T + 2% $ZrO_2$ | 6.68 | 20.68 | 175 | 17.95 | 138 | 21.5 | 183 |

TABLE 2-continued

| Table<br>21600° C.,<br>90 h | Den-<br>sity<br>(g/cm³) | Total corrosion Volume (%) | Total corrosion Index | Submerged corrosion Volume (%) | Submerged corrosion Index | Subli-<br>mation Volume (%) | Subli-<br>mation Index |
|---|---|---|---|---|---|---|---|
| T + 4% ZrO₂ | 6.63 | 19.66 | 184 | 25.20 | 99 | 18.1 | 217 |
| T + 6% ZrO₂ | 6.61 | 15.23 | 237 | 25.37 | 98 | 12.4 | 318 |
| T + 8% ZrO₂ | 6.54 | 14.06 | 257 | 30.11 | 83 | 9.4 | 419 |

The test samples containing 1.0 wt % and 2.0 wt % of $ZrO_2$ show the most improvement in submerged corrosion resistance over the T composition, with the sample containing 1.0 wt % $ZrO_2$ showing a substantial improvement. The samples containing 4.0 wt %, 6.0 wt % and 8.0 wt % $ZrO_2$ show a decrease in the submerged corrosion resistance as compared to the standard for the T composition. Table 2 also illustrates that the sublimation resistance index improved for all samples with $ZrO_2$ additions, with the greatest increase for the sample containing 8.0 wt % $ZrO_2$. While, the densities of all samples containing $ZrO_2$ decreased, the samples containing lesser amounts of $ZrO_2$, such as 1.0 wt % and 2.0 wt %, demonstrate a smaller decrease in density, as compared to the compositions containing 6.0 wt % and 8.0 wt % $ZrO_2$. According to the submerged corrosion resistance data in Table 2, the samples containing 1.0 wt % and 2.0 wt % of $ZrO_2$ illustrate compositions suitable for applications that need a balance of sublimation performance with submerged corrosion and density.

Figure 3:
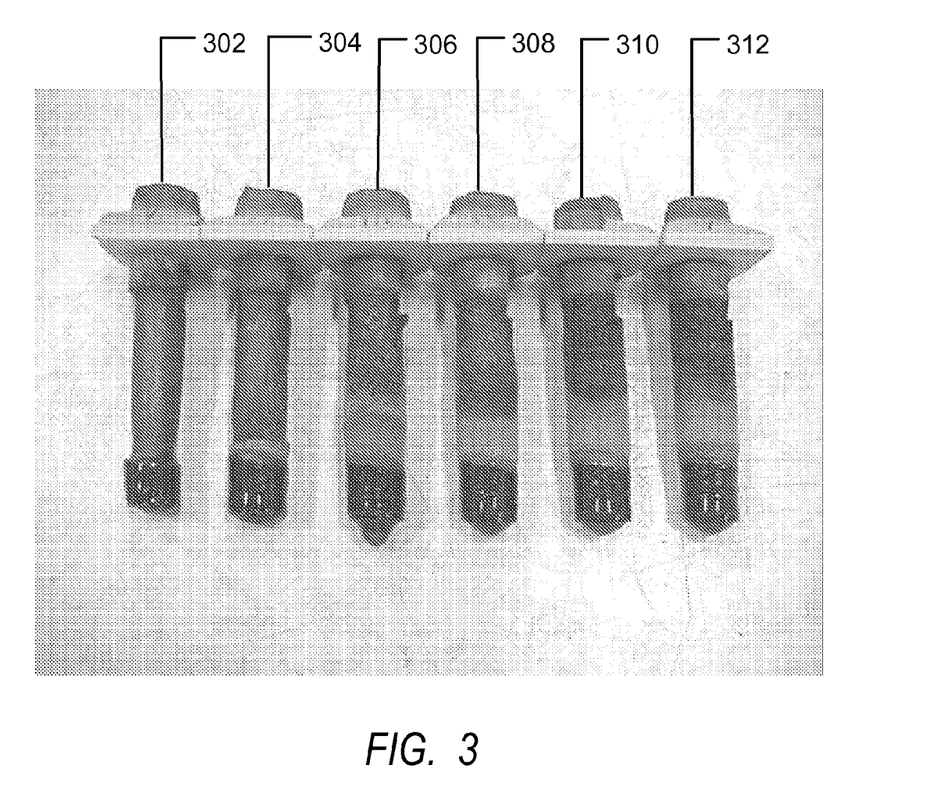
FIG. 3 is a picture of sample electrodes after a dynamic corrosion analysis showing various degrees of volume loss due to corrosion.

FIG. 3 illustrates representative samples from each group of the tested compositions in Table 2. As before, the T composition standard 302 shows substantial volume loss compared to the samples containing $ZrO_2$. The samples containing 1.0 wt % and 2.0 wt % of $ZrO_2$, 304 and 306 respectively, which had improved submerged corrosion resistance index according to Table 2, show a decrease in volume loss compared to the T composition. The samples containing 4.0 wt %, 6.0 wt % and 8.0 wt % $ZrO_2$, 308, 310 and 312 respectively, also show less volume loss despite the decrease in submerged corrosion resistance. This is likely due to the improvement of the sublimation resistance index.

Figure 4:
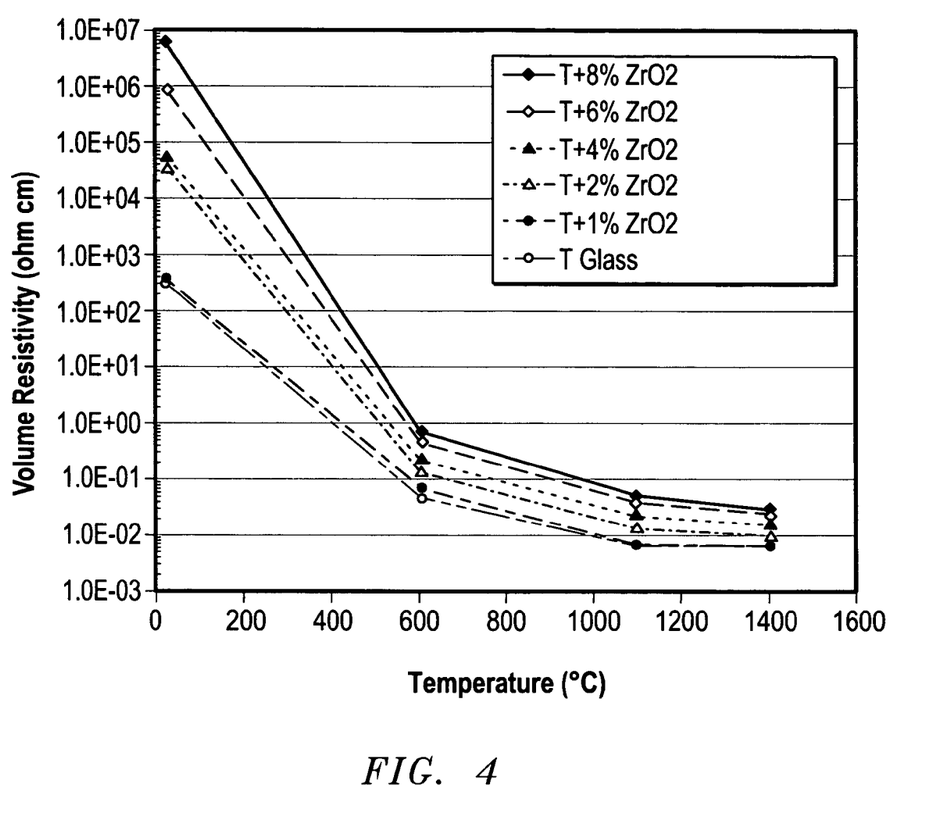
FIG. 4 is a graph illustrating the resistivity of electrode samples from Table 2 at various temperatures.

Turning to FIG. 4, a graph illustrates the resistivity of the samples from Table 2 at various temperatures. The resistivity of each sample was tested using the same procedure as described previously. Similar to the results illustrated in FIG. 2, the trends illustrate that resistivity of the samples increases with an increase in the amount of the corrosion inhibitor. Generally, the resistivity of the samples containing higher percentages of $ZrO_2$, such as 6.0 wt % and 8.0 wt %, have higher resistivities at lower temperatures as compared to the T composition. However, the sample containing 1.0 wt % $ZrO_2$ shows a resistivity comparable to the standard at all temperatures. The sample containing 8.0 wt % $ZrO_2$ showed the highest resistivity at 1400° C., nearly a factor of ten greater than the resistivity of the standard or the sample containing 1% addition of $ZrO_2$.

The preceding tables and figures show that an amount of $ZrO_2$, less than about 4% and preferably not greater than about 2% inhibits submerged corrosion, while maintaining nearly the same density and resistivity properties of the Z composition and T composition materials. The addition of the corrosion inhibitor improved the resistance of the conventional electrode composition and extends the lifetime of the electrode. A suitable composition for an electrode balances the corrosion resistance with the resistivity. Given the resistivity data illustrated in FIG. 4 coupled with the corrosion resistance information of Table 2, a suitable composition would comprise not greater than about 4.0 wt % or even 2.0 wt % $ZrO_2$ and preferably about 1% $ZrO_2$ in the T composition base.

Figure 5:
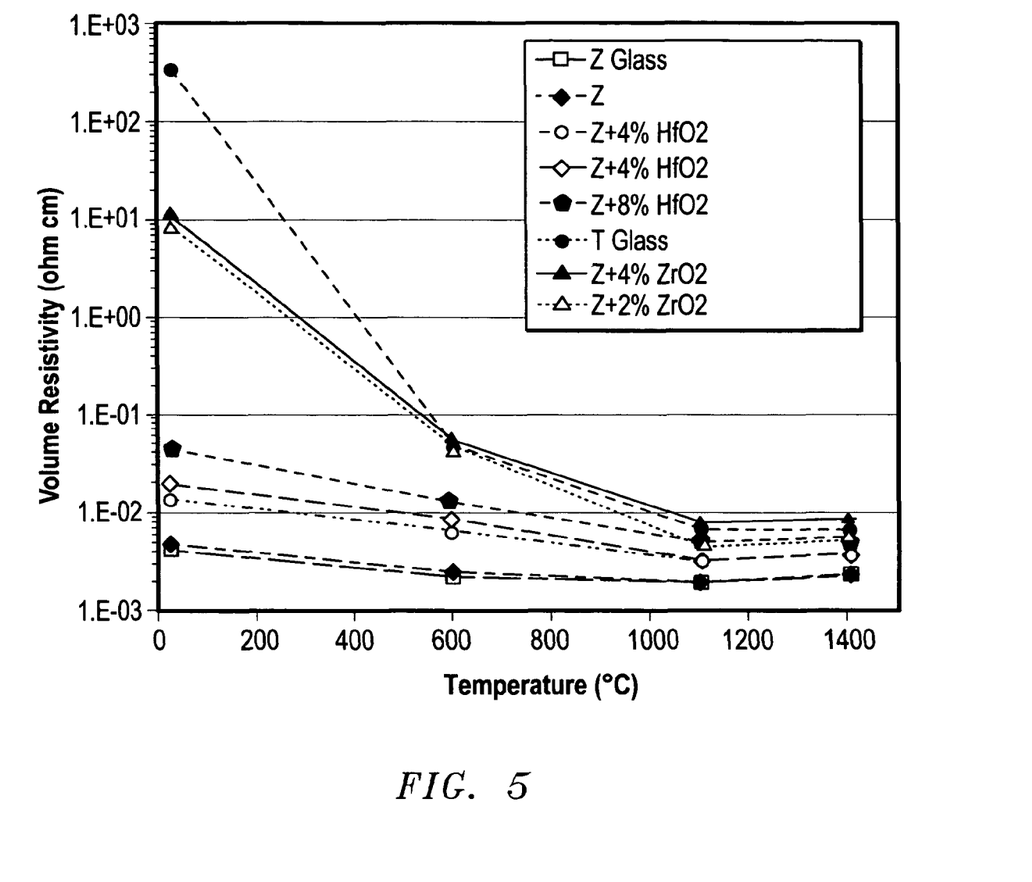
FIG. 5 is a graph illustrating the resistivity of electrode samples from Table 3 and other standard electrode compositions at various temperatures.

Turning to FIG. 5, a graph illustrates the resistivity of the samples having different compositions at various temperatures. The samples illustrated in FIG. 5 are the samples provided in Table 3 as well as conventional industrial standards, such as Z compositions and T compositions, and samples containing 1.0 wt % and 2.0 wt % of $ZrO_2$. The samples were tested using the same procedure as previously described. FIG. 5 demonstrates that an increase in the amount of the corrosion inhibitor, either $HfO_2$ or $ZrO_2$, results in an increase in resistivity at all temperatures versus the Z composition. The difference in resistivity between the samples containing a corrosion inhibitor and the Z composition is more pronounced at room temperature and less pronounced at the highest temperature. Yet, all samples containing $HfO_2$ demonstrate lower resistivity than all samples containing $ZrO_2$ particularly at lower temperatures. The highest additive percentage of $HfO_2$ (8.0 wt %) demonstrates a lower room temperature resistivity than the 1.0 wt % additions of $ZrO_2$. FIG. 4 illustrates that at room temperature, an 8.0 wt % addition of $HfO_2$ has a resistivity of at least 100 times less than a composition with a 2.0 wt % addition of $ZrO_2$. However, at higher temperatures the difference between these compositions is negligible, as illustrated by the measurements at 1400° C. Overall, FIG. 4 indicates that in the Z composition, the corrosion inhibitor $HfO_2$ would have a lesser effect on resistivity than $ZrO_2$.

$HfO_2$ in an amount less than about 8.0 wt % inhibits submerged corrosion and sublimation, while maintaining substantially the same density and resistivity properties of conventional industry standard compositions, such as Z and T. The tables and figures also show that $HfO_2$ has suitable corrosion inhibiting characteristics comparable to that of other corrosion inhibitors, such as, $ZrO_2$. In fact, $HfO_2$ may be added in greater amounts to improve the corrosion resistance without unduly affecting the electrical properties. The addition of $HfO_2$ improved the submerged corrosion resistance and extended the lifetime of the sample.

While embodiments of the invention have been illustrated and described as tin oxide-based electrodes and structures incorporating same, the invention is not intended to be limited to the details shown, since various modifications and substitutions can be made without departing in any way from the scope of the present invention. For example, additional or equivalent substituents can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:
1. A tin oxide based electrode formed of a composition, comprising:
   a base material comprising tin oxide;
   a resistivity modifier;
   a sintering aid; and
   a corrosion inhibitor in an amount effective to reduce total corrosion of the electrode with respect to molten glass, the corrosion inhibitor forming a solid solution with the base material, the corrosion inhibitor including a com- pound selected from the group consisting of $ZrO_2$ in an amount of not greater than 4.0 wt %, $HfO_2$, $TiO_2$, and combinations thereof.

2. The electrode of claim 1, wherein the corrosion inhibitor is selected from the group consisting of $ZrO_2$, and $HfO_2$ and combinations thereof.

3. The electrode of claim 2, wherein the corrosion inhibitor comprises $HfO_2$.

4. The electrode of claim 1, wherein the corrosion inhibitor comprises $ZrO_2$ in an amount of at least 1 wt %.

5. The electrode of claim 1, wherein the sintering aid is selected from the group consisting of CuO, ZnO, $Mn_2O_3$, CoO, and $Li_2O$ and combinations thereof.

6. The electrode of claim 1, wherein the sintering aid comprises not greater than about 1.0% of the total composition by weight.

7. The electrode of claim 1, wherein the resistivity modifier is selected from a group consisting of $Sb_2O_3$, $As_2O_3$, $Nb_2O_5$, $Bi_2O_3$, $UO_2$ and $Ta_2O_5$ and combinations thereof.

8. The electrode of claim 1, wherein the resistivity modifier comprises not greater than about 1.0% of the total composition by weight.

9. The electrode of claim 1, wherein the electrode has a resistivity not greater than about 5.0 E-1 ohm cm at 1400° C.

10. The electrode of claim 9, wherein the electrode has a resistivity not greater than about 5.0 E-2 ohm cm at 1400° C.

11. The electrode of claim 1, wherein the density of the electrode is not less than about 6.55 g/cm³.

12. The electrode of claim 1, wherein the corrosion inhibitor has a partial pressure of not greater than about 1.0 E-7 atmospheres at 1500° C.

13. The electrode of claim 12, wherein the corrosion inhibitor has a partial pressure not greater than about 1.0 E-8 atmospheres at 1500° C.

14. The electrode of claim 12, wherein the corrosion inhibitor has a partial pressure not greater than about 1.0 E-10 atmospheres at 1500° C.

15. The electrode of claim 1, wherein the corrosion inhibitor has a melting point not less than about 1700° C.

16. A tin oxide based electrode formed of a composition, comprising:
   a base material comprising tin oxide;
   a resistivity modifier;
   a sintering aid; and
   a corrosion inhibitor forming a solid solution with the base material, the corrosion inhibitor including a compound selected from the group consisting of $HfO_2$, $TiO_2$, and combinations thereof.

17. A tin oxide based electrode formed of a composition, comprising:
   a base material comprising tin oxide;
   a resistivity modifier;
   a sintering aid; and
   a corrosion inhibitor in an amount effective to reduce sublimation of the electrode with respect to molten glass, the corrosion inhibitor forming a solid solution with the base material, the corrosion inhibitor including a compound selected from the group consisting of $ZrO_2$ in an amount not greater than 4.0 wt %, $HfO_2$, $TiO_2$, $Ta_2O_5$, and $CeO_2$, and combinations thereof.

* * * * *